United States Patent [19]
Hansen et al.

[11] Patent Number: 6,120,430
[45] Date of Patent: Sep. 19, 2000

[54] METHOD OF MELTING SOLID MATERIALS

[76] Inventors: James E. Hansen, 221 Broadmoor; Leo E. Thompson, 9014 W. John Day, both of Richland, Wash. 99352; Patrick S. Lowery, 714 S. Penn Pl., Kennewick, Wash. 99336

[21] Appl. No.: 08/872,632

[22] Filed: Jun. 10, 1997

[51] Int. Cl.[7] .............................. B09B 1/00; B09B 3/00; B09C 1/06; E02D 3/11

[52] U.S. Cl. .................. 588/253; 405/128; 405/131; 588/259; 588/900

[58] Field of Search ............. 166/60, 248; 65/134.8; 405/128, 129, 131; 588/11, 12, 252, 253, 259, 900

[56] References Cited

U.S. PATENT DOCUMENTS

| | | | |
|---|---|---|---|
| 4,376,598 | 3/1983 | Brouns et al. | 405/258 |
| 4,762,991 | 8/1988 | Timmerman et al. | 250/227 |
| 4,900,196 | 2/1990 | Bridges | 405/131 X |
| 4,956,535 | 9/1990 | Buelt et al. | 219/10.81 |
| 5,004,373 | 4/1991 | Carter | 405/131 |
| 5,024,556 | 6/1991 | Timmerman | 405/128 |
| 5,100,259 | 3/1992 | Buelt et al. | 405/128 |
| 5,114,277 | 5/1992 | Murphy et al. | 405/128 X |
| 5,316,411 | 5/1994 | Buelt et al. | 166/248 X |
| 5,910,093 | 7/1999 | Sliger | 588/253 |

OTHER PUBLICATIONS

Buelt et al, In Situ Vitrification of Transuranic Waste: An Updated Systems Evaluation and Applications Assessment, Battelle, Mar. 1987, pp. vi, 39, 104, Mar. 1987.

*Primary Examiner*—George Suchfield
*Attorney, Agent, or Firm*—Bruce A. Kaser

[57] ABSTRACT

A method of melting solid materials while controlling melt shape, without the expenditure of energy to melt unwanted quantities of surrounding materials, and an apparatus to effect the method. The method comprises the use of a planar starter path between electrodes so as to initiate melting and/or vitrification in a plane rather than in a discrete linear path between electrodes. Because melting is initiated along a significant portion of the linear dimension of the electrodes, creating a melted zone that is deeper than it is thick, the aspect ratio (depth "Y"/width "Z") of the melted mass is greater than 1.0.

7 Claims, 12 Drawing Sheets

Fig. 3A  Fig. 3 "PRIOR ART"

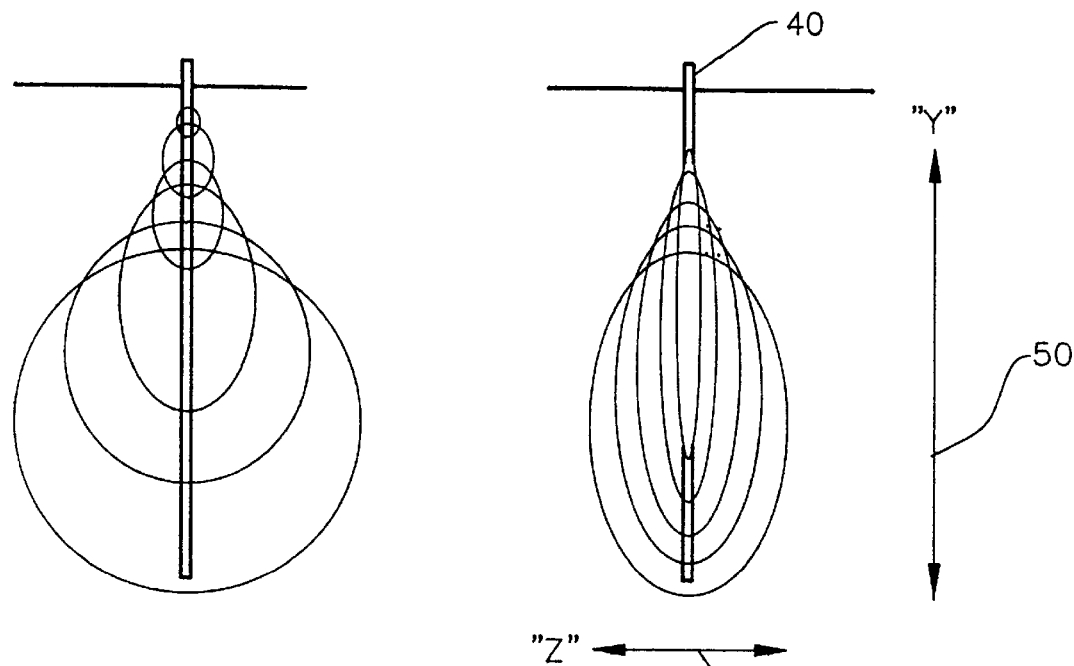
Fig.5A
"PRIOR ART"
Fig.5B
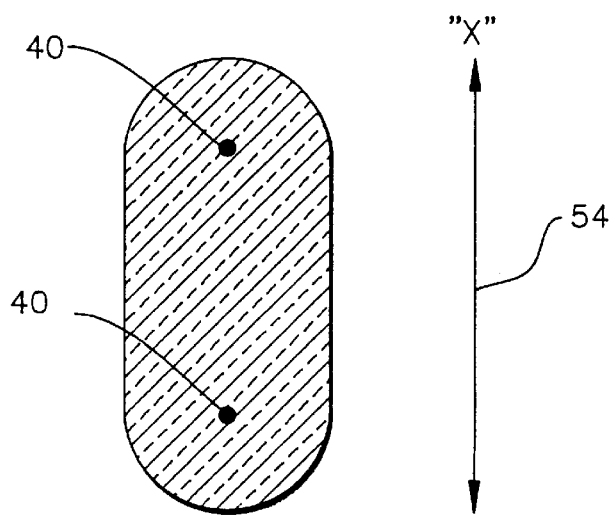
Fig. 6

METHOD OF MELTING SOLID MATERIALS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to the melting of solid materials to produce a vitrified and/or crystalline material, by initiating a melt by passing electrical current through a planar starter path positioned between a plurality of electrodes, and thence through the surrounding solid materials. The solid materials may be soil, either undisturbed or staged, waste materials assembled at a site for disposal, or any other solid materials that can be melted and which will support joule heating during processing.

In-situ vitrification or melting of soil and other solid materials is well known, as illustrated by the many patents issued to, among others, Battelle Memorial Institute. For example, U.S. Pat. No. 4,376,598 issued Mar. 15, 1983, discloses a method of solidification of soil and other solid materials contained in the soil, by passing electrical current through melted materials between electrodes. An initial electrically conductive resistance path is provided between the electrodes, and application of current to the electrodes is continued until the solid materials between the electrodes have been melted.

The electrically conductive resistance path (the "starter path") is necessary to obtain electrical conduction between the electrodes sufficient to initially generate adequate heat to melt the soil and other solid materials adjacent to the starter path, and then to transfer the flow of current to these melted materials. Upon melting, the molten earth or other material becomes significantly more electrically conductive than it is in the unmelted state. Electricity then can flow through the molten media, being converted to heat by the phenomenon of joule heating, which heat is then conducted into and melts more adjacent solid materials. Such melting has heretofore been initiated at or near the upper surface of the solid materials in a horizontal linear path, with the melt area growing outward and downward as electrical power continues to be applied.

A number of different methods of establishing the electrically conductive resistance path have been proposed, such as graphite or sodium hydroxide paths, sacrificial resistance elements (a metal resistance coil or wire), and chemical reagents to create a highly exothermic chemical reaction. In U.S. Pat. No. 5,004,373, a cord of dielectric material (such as glass fiber) is impregnated with a conductive material (such as graphite) for initiating in-situ vitrification.

As illustrated in U.S. Pat. No. 4,376,598, the starter path was a relatively small "layer" (2.5 cm deep and 2.5 cm in width) of graphite flakes in a trench between the electrodes.

The intent of such graphite layer was merely to "provide a conductive resistance path [between the electrodes to] raise the temperature of the soil about the conductive resistance path to its melting temperature." While it was contemplated that the vitrification of materials would proceed as illustrated in the '598 patent, in fact it was found that the formation of the melt zone more closely approached that illustrated in U.S. Pat. No. 4,956,535. Starter paths having graphite as a primary component (generally in the form of flakes) are now the preferred method of initiating the melting process.

It is now known that with a horizontal, linear starter path placed near the surface of the ground as in the prior art, the melt zone progresses as illustrated in FIG. 1 herein ("Prior Art") and in FIGS. 10 and 12 of the '535 patent. As illustrated in FIG. 1, the melt 10 is initiated by a horizontal linear starter path 26 and assumes a balloon configuration, as it expands in all of the "X" (laterally in the plane between the electrodes), "Y" (downwardly"), and "Z" (laterally perpendicular to the plane of the electrodes) dimensions. The result is a melted cylindrical mass with hemispherical ends. The melt pool 10 illustrated herein represents the "growth" of the melted area as the melt pool grows. Therefore, as illustrated in FIG. 1 (and in subsequent drawings), the melt pool grows sequentially from the startup at A, and then grows downwardly and outwardly to B, C, D and E. The previous melt pools (A–D) are shown as discrete entities for the purposes of illustration only—in fact, the melt pool increases in size over time until it results in a single large melted area. Volume reduction and subsidence accounts for the location of the final melt pool and solidified mass occupying a volume substantially smaller than that previously occupied by the un-melted solid materials (the volume of A+B+C+D+E). As illustrated in the '535 patent, additional electrodes were necessary to "square up" the vitrified mass. Through experience, it has been found that conduction of heat from the melted volume into adjacent unmelted materials is directly related to the melted volume's surface area.

In theory, in perfectly dry, uniform soil, a melt will progress uniformly in all of the X, Y and Z directions. Because the melt progresses in both directions (from a line drawn between the electrodes) in the "Z" dimension, the lateral growth will theoretically be twice the downward growth, hence a theoretical aspect ratio (the ratio of depth-to-width: Y/Z) of 0.5. It is believed, however, that because most materials to be melted contain liquids or other vaporizable materials (such as water in soil) which will be vaporized by the downwardly-encroaching melt pool, the relatively "cool" vapors will proceed up the sides of the melt pool, cooling the sides and slowing the rate of lateral (Z) growth. Therefore, the rate of downward growth of a prior art melt pool will increase nominally faster than the lateral growth rate, resulting in an actual aspect ratio of up to 1.5. However, as the melt pool grows larger, other factors related to heat transfer cause the rate of downward ("Y") melting relative to outward ("z") melting to diminish (illustrated in FIG. 1 with successive melts A, B, C, D and E), and ultimately it becomes uneconomic to continue melting with the intent of extending the melt downward with conventional equipment, since the rate of (unwanted) growth in the "Z" dimension greatly exceeds the rate of desired growth in the "Y" dimension. Thus, the conventional technology is limited to operation with melt aspect ratios in the range of approximately 1.0 to 1.5.

Applicant has observed in large scale applications employing up to four megawatts of power, and utilizing the prior art linear starter path startup procedure, after a 4-electrode melt reaches about 20' in depth, with a width of approximately 40–45', the downward growth of the melt slows to a point of being uneconomic to continue (insufficient power is available to melt a much larger mass), and such melts are typically terminated at that point, or earlier. Therefore, when using commercially available large scale equipment, there is an inherent limit to how deep one can extend in situ vitrification. Of course, more powerful equipment can be used to produce even larger, deeper melts; however such equipment would have its own economic depth limit.

Applicant has found that, in using the methods disclosed in, for example, the '598 patent, the current practical limit of melt depth ("Y") using commercial scale in-situ vitrification equipment (4 MW) is approximately 20 feet. At this depth, using a starter path as disclosed in the '598 patent, the melt width ("Z") is approximately 20–22 feet (per pair of electrodes, or about 45 feet for 4 electrodes). Therefore, unless the area to be vitrified is at or above about 20 feet below the surface, it is not economical to continue melting laterally in order to minimally increase the depth of the melt. While thermal barriers may be employed to limit lateral ("Z") melt expansion, such barriers are difficult to construct, may not work properly, and are expensive.

As noted above, conventional melts having a horizontal linear starter path necessarily begin very wide and very shallow, thereby producing a very low aspect ratio (depth/width), which increases as the melt grows in depth. Applicant has observed that the aspect ratio of conventional melts rarely if ever is greater than about 1.0, or 1.3 at the maximum, at depths of commercial interest. For example, using conventional equipment, the largest practicable melt at the closest electrode separation (10') with a horizontal linear starter path therebetween, produces a melt approximately 20' wide and 20' deep per pair of electrodes.

There are many cases in which a shaped melt zone (having an aspect ratio of >1.5) may be desirable. The ISV process of the '535 patent produces a melt that "grows" at will, whereas the present invention permits a melt to be tailored to fit either the site requirements and/or to reduce cost. One of the greatest advantages of being able to control melt aspect ratio is the minimization of widthwise overmelting.

For example, when it is desired to melt a volume 20 feet deep and 10 feet wide using conventional technology, it would be necessary to melt 20' wide in order to attain the 20' depth. Such processing involves melting twice the amount of material targeted, resulting in twice the time and cost. In such applications, it is desirable to perform a melt with an aspect ratio of 2.0 (twice the depth as width). The ability to control the aspect ratio can have tremendous impact on the cost of a melt and therefore its commercial viability.

As illustrated in FIG. 2, many hazardous waste sites are arranged as trenches 12 wherein the hazardous waste is buried with soil in a "U" or "V" shaped trench. The side walls of the trench may be lined with rock 14. In-situ vitrification may not be cost effective, or may present safety problems, in such cases since the natural formation of the balloon shaped melt pool 16 (as illustrated in the '535 patent) is the exact opposite shape one would desire in such cases. Because the melt may seal off to the sides of the trench, lateral movement of gases 18 generated under the melt pool 16 may be restricted by the sides of the trench, and such gases may be forced upwardly 20 through the melt zone 16, creating disturbances and discontinuities therein. Such "bubbles" may cause significant problems in maintaining an effective melt and may cause eruptions at the surface, endangering the integrity of electrodes 22 and off-gas collection apparatus 24 covering the melt. Such eruptions have been severe enough to cause melting and/or damage to hood components 24 and other equipment associated with the ISV process.

Generally speaking, in-situ vitrification now proceeds with electrodes 28 that are continuously fed (possibly through a sleeve 30) into the melt pool as the melt process proceeds (FIG. 3). As currently practiced, neither the electrodes nor the sleeves are initially inserted to the desired final depth during startup. As the melt pool grows downwardly, the electrodes are fed downwardly.

Additionally, there have been many attempts to create subterranean "walls" of vitrified material to act as barriers. Such underground structures have not heretofore been constructed economically or with precision, because the aspect ratio is so small (melts are too wide) as to make such structures uneconomic. Accordingly, a 20' deep wall made by two electrodes using conventional methods produces a 20' wide (or wider) melt—using substantially more time and energy melting than is required to produce a "wall". For barrier wall applications, it is desirable to be able to control melt aspect ratio in the range of 4 to 20, which is impossible when using prior art technology (capable of maximum aspect ratios in the range of 1.0 to 1.5).

Numerous inventions have been disclosed to aid in the practice of in-situ vitrification. For example, U.S. Pat. No. 4,762,991 discloses a probe which monitors a plurality of sensors placed along the expected path of an ISV melt. The probe receives temperature signals from the sensors and transmits them to a remote location. U.S. Pat. No. 5,024,556 discloses a system to promote destruction of volatile and/or hazardous contaminants during in-situ vitrification by forming a cold cap over the vitrified mass.

BRIEF SUMMARY OF THE INVENTION

The present invention comprises a method, and an apparatus to practice the method, of melting solid materials wherein a more precisely sized and shaped melt pool, and subsequent cooled monolithic glass and/or crystalline mass, may be obtained. Such control of the melt may be required because of physical site limitations, or to effectively vitrify a relatively small section of an underground location, or to construct a subterranean "wall".

The method of the present invention comprises conventional in situ vitrification processing equipment, with at least two electrodes that extend initially downwardly through the ground to a depth sufficient to produce the desired melt zone. Electrically conductive resistance materials are placed between the electrodes for a substantial portion of their linear dimension to form a starter path, thereby defining a vertically-oriented plane of starter path material between the electrodes. When electricity is applied to the electrodes, the electrically conductive resistance materials are heated to a temperature greater than the melting point of the surrounding soil or other solid material. Upon melting, the melted soil then conducts electricity more easily, and continued resistance heating of the melt causes adjacent soil to form a growing "melt pool" of melted materials.

The method of the present invention can be practiced on any material capable of being melted by joule heating, and in particular on contaminated undisturbed soil, on soil moved to a location for processing, on a mixture of "in situ" soil and solid materials (such as drums or other waste products), or in any other configuration wherein it is desired to melt solid materials.

The aspect ratio of the melt pool of the present invention can be controlled with relative precision, such that the ratio of the vertical dimension ("Y") of the melt pool formed by the method of the present invention to the width dimension ("Z") may be controlled in the range of about 1 to 20, indicating that the melt pool can be created and controlled downwardly without significant undesired lateral growth of the melt pool.

The present invention also comprises an apparatus in the form of at least two vertically oriented linear electrodes and a planar starter path in contact with the electrodes over a substantial portion of the linear dimension of the electrodes. This apparatus assures that the melt pool starts deeper, with an initial aspect ratio of about 40–50, so that the desired depth of the melt pool is not limited by unwanted and uneconomical lateral growth.

Other aspects of the present invention will become apparent with reference to the following description of the various embodiments the invention may take.

BRIEF DESCRIPTION OF THE SEVERAL VIEWS OF THE DRAWINGS

FIG. 3 is a schematic representation of the electrodes and linear starter path of a conventional in-situ vitrification process, labeled "Prior Art";

FIG. 3A is a sectional view of the starter path of FIG. 3 taken along lines 3A—3A of FIG. 3;

FIG. 5a is a schematic representation of a side view of a melt pool configuration of the prior art, wherein adjacent lines illustrate growth of the melt pool;

FIG. 5b is a schematic representation of a side view of a melt pool configuration of the present invention similar to that of FIG. 5a;

FIG. 6 is a schematic representation of a plan view of a melt pool configuration of the present invention;

FIG. 11b is a schematic representation of a plan view of the embodiment of FIG. 11a;

DETAILED DESCRIPTION OF THE INVENTION:

As used herein, the following terms have the following definitions:

IN-SITU VITRIFICATION (ISV): means vitrification or melting of materials as they lie at the time of treatment. Such materials may be undisturbed from their locus of deposition or origin, or they may be excavated and moved (staged) to a different location for treatment. Whereas the term "vitrification" is often thought of as the making of a glass product, the use of this term by those skilled in this art may also include processes wherein materials are melted but not glassified, instead making a solidified glass and/or crystalline amorphous mass.

SOLID MATERIAL: means earthen materials capable of being melted by joule heating, including soil, soil contaminated with liquid hazardous or other wastes, or a mixture of soil and solid hazardous wastes as typically found at hazardous waste disposal sites, sediments, mine tailings and other predominantly inorganic materials.

HAZARDOUS WASTES: means wastes requiring treatment, however classified, including those wastes defined by those in the industry as hazardous, radioactive and mixed wastes.

STARTER PATH: means an electrically conductive resistance material placed between at least two electrodes to initiate melting of solid material. While in many cases conventional materials such as graphite flakes, or graphite flakes mixed with glass frit is the preferred embodiment, it is to be appreciated that any material having the desired electrical resistance characteristics (such as, in some cases, native soil) may be utilized.

As should be apparent from the definitions above, it is intended that the definition of in-situ vitrification (ISV) not be limited to the situation wherein a relatively undisturbed site is contaminated with, for example, a hazardous chemical spill. Sites having buried wastes, sites where the contaminated soil or other solid material has been excavated and removed to a secondary site for processing, and the like are also to be included within this definition. For ease of description, hereinafter whenever the term "ground" is used, it is to be understood that it comprises any embodiment wherein solid material is subjected to in-situ vitrification.

Figure 4A:
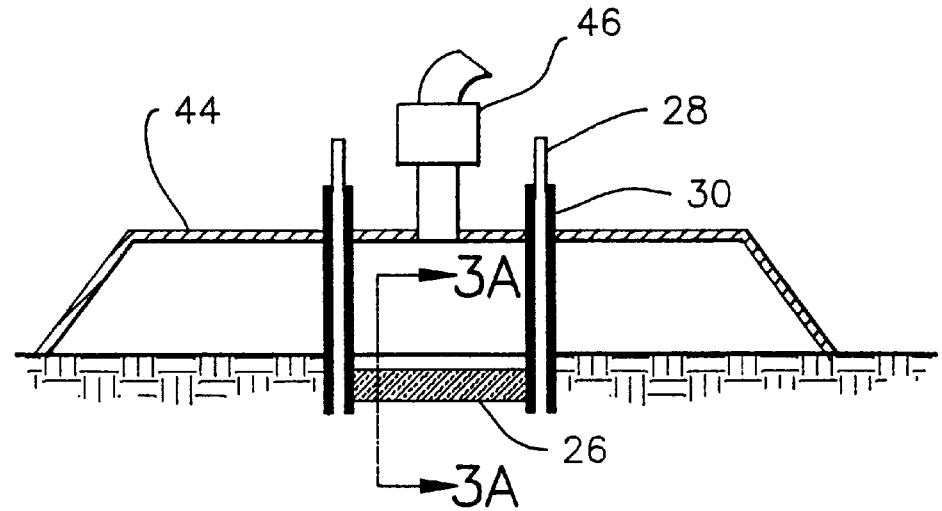
FIG. 4A is a sectional view of the starter path of FIG. 4 taken along lines 4A—4A of FIG. 4.
Figure 4:
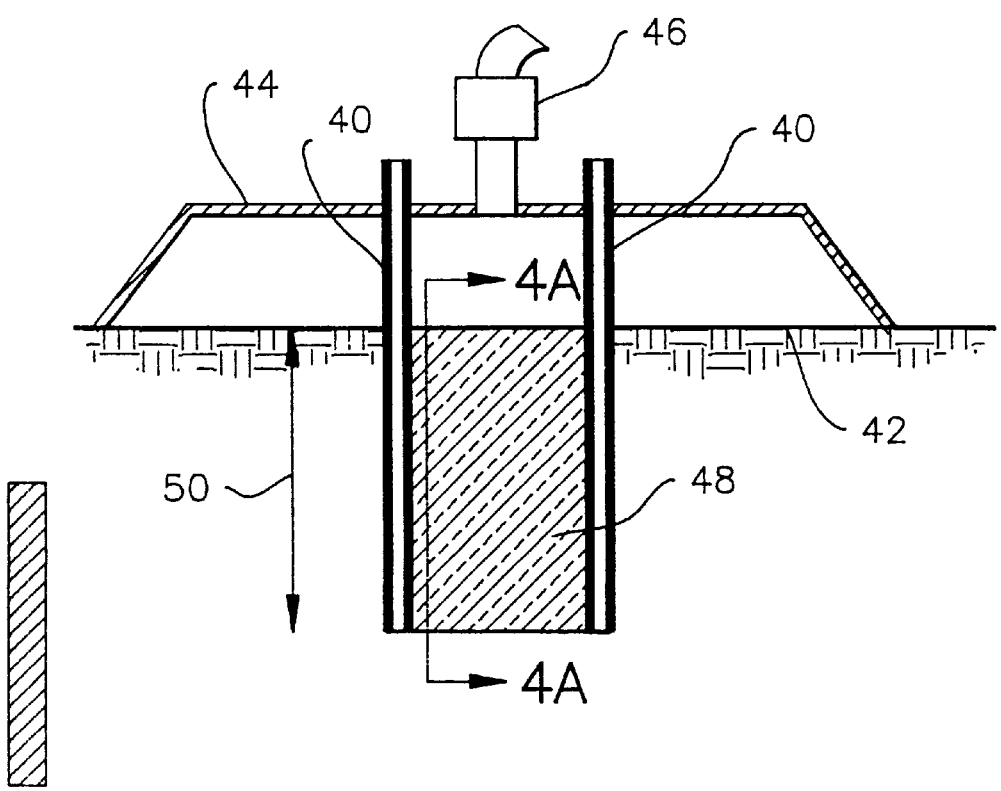
FIG. 4 is a schematic representation of the electrodes and planar starter path of the process of the present invention.

As illustrated in FIG. 4, the broadest embodiment of the present invention involves at least two linear electrodes 40 (either sheathed or unsheathed) inserted into and beneath the surface of the ground 42. It is to be appreciated that while the method of the present invention is illustrated in the context of vertically-oriented electrodes and starter path, other geometries are possible (such as electrodes inserted into the soil at an acute angle to the surface of the soil). It is also to be understood that the upper dimension of the planar starter path need not be at grade level—the starter path may begin a predetermined distance below grade and proceed downwardly therefrom.

A containment hood 44 and off-gas treatment apparatus 46 are shown schematically herein; these are well-known to those of ordinary skill in this art and require no further description. In contrast to the prior art methods, wherein the electrodes are inserted minimally into the ground and then fed into the melt as it progresses (FIG. 3), the electrodes 40 of the present invention are inserted a substantial distance into the ground, generally to the full depth of the planar starter path. Between the electrodes, electrically conductive resistance materials 48 (the starter path) are placed. When in place, the starter path will assume a planar configuration and will traverse a significant portion of the linear dimension ("Y") of the electrodes. As used herein, "planar" need not be flat—that is, the planar starter path may be provided with a curvature or other irregular shape between the electrodes. The greater total area of starter path allows for passage of significantly more electrical power to be delivered during operation than with conventional linear starter paths, as is evident from a comparison of FIGS. 3 and 4. The linear (vertical) dimension 50 ("Y" of FIG. 1a) of the starter path 48 will determine the dimensions of the final melt pool.

Figure 1:
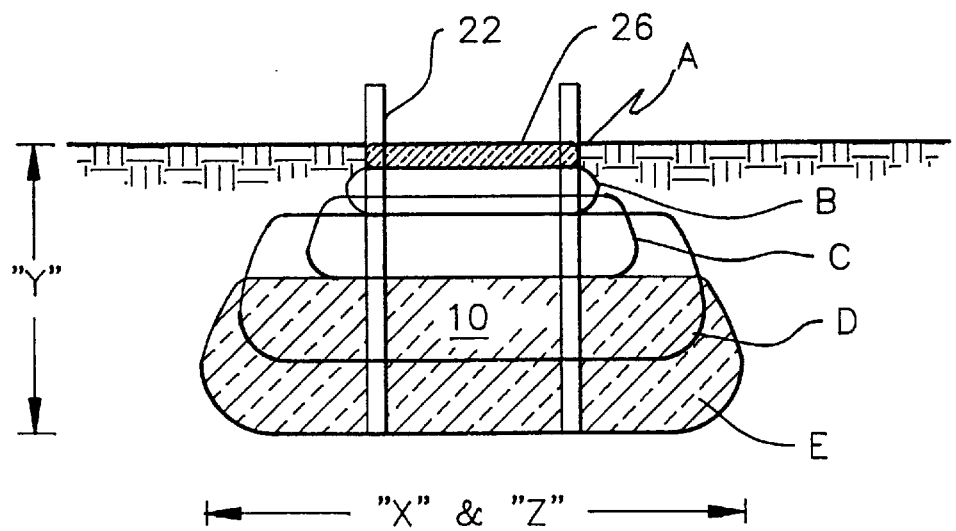
FIG. 1 is a schematic representation of a melt pool created by conventional in-situ vitrification and labeled "Prior Art"
Figure 1A:
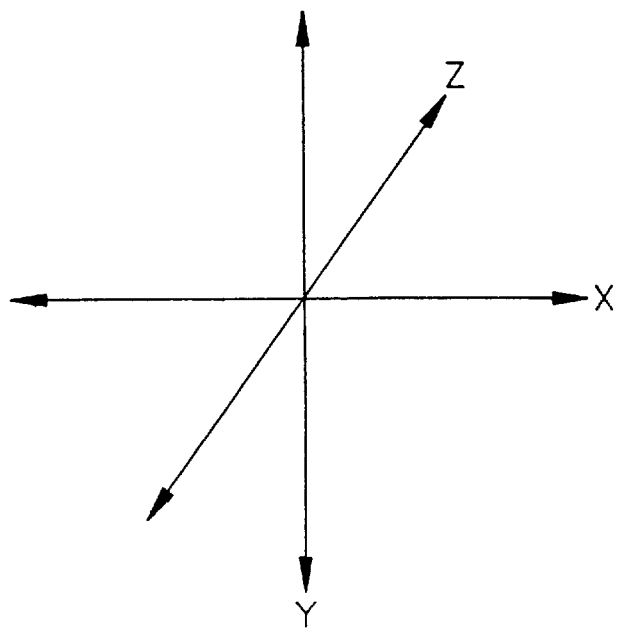
FIG. 1a is a representation of the dimensions of a melt pool.

In contrast to the melt pool of FIG. 1 of the prior art, the melt pool of the present invention is illustrated schematically in FIGS. 5a and 5b. (Note that the orientation of the electrodes of FIGS. 5a and 5b is 90 degrees from that of FIG. 1; that is, FIG. 1 is a view along the "Z" axis whereas FIGS. 5a and 5b is a view along the "X" axis.) Whereas the prior art melt pools generally have an aspect ratio (the ratio of depth:width) less than 1.0, the melt pools of the present invention have aspect ratios generally in the range of 1.0 to 20. With a starter path dimension of "Y" in FIGS. 5a and 5b the depth dimension will always exceed "Y" (there will be some growth downwardly from the electrodes), while the width dimension "Z" 52 can be controlled to be substantially smaller. Because melting will always first occur adjacent the starter path, the "Y" dimension of the melt pool will typically correlate with the vertical dimension of the starter path. When cooled, the melt pool will comprise a crystalline and/or glass monolith approximating the size and shape of the final melt pool. The "X" (width) dimension 54 of FIG. 6 of the melt pool will typically be somewhat larger than the dimension between the two electrodes. While some growth in the "X" dimension beyond the electrode separation dimension may be expected, such growth can be anticipated so as to not impact the economics of the present invention.

Figure 7:
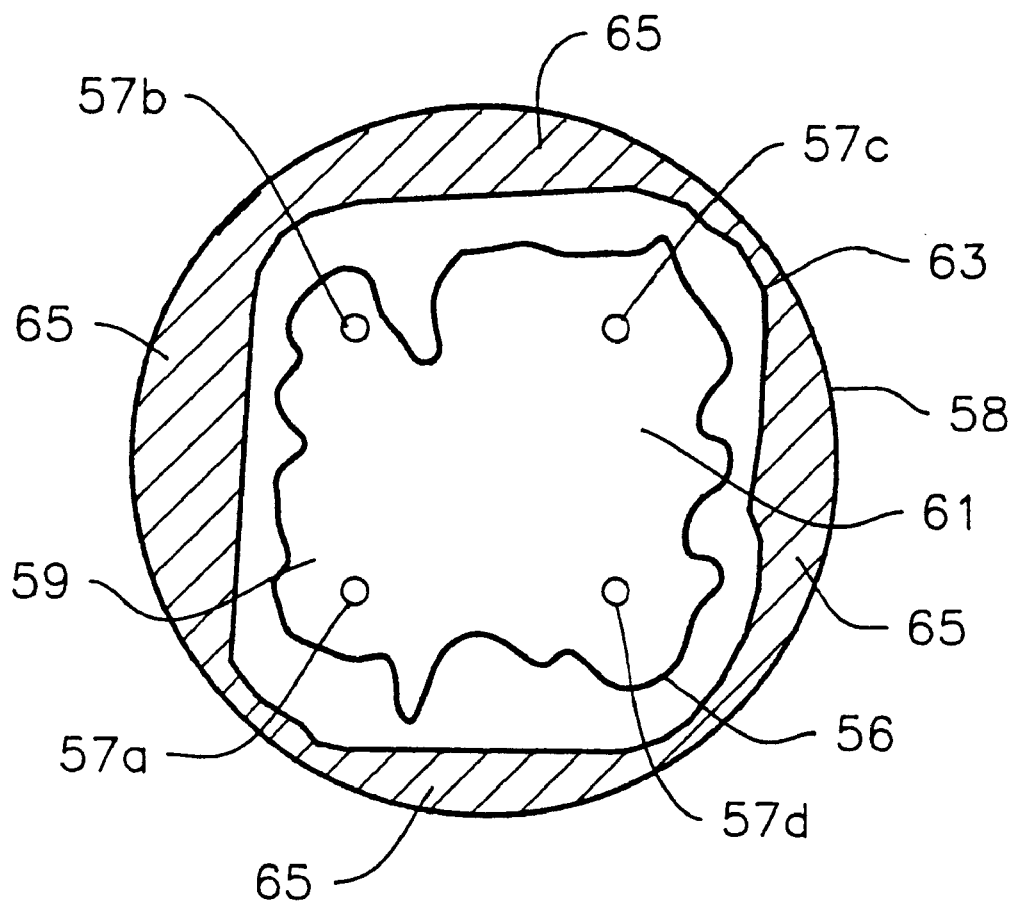
FIG. 7 is a plan view of a 4 electrode set comparing the instant invention to the prior art.
Figure 8:
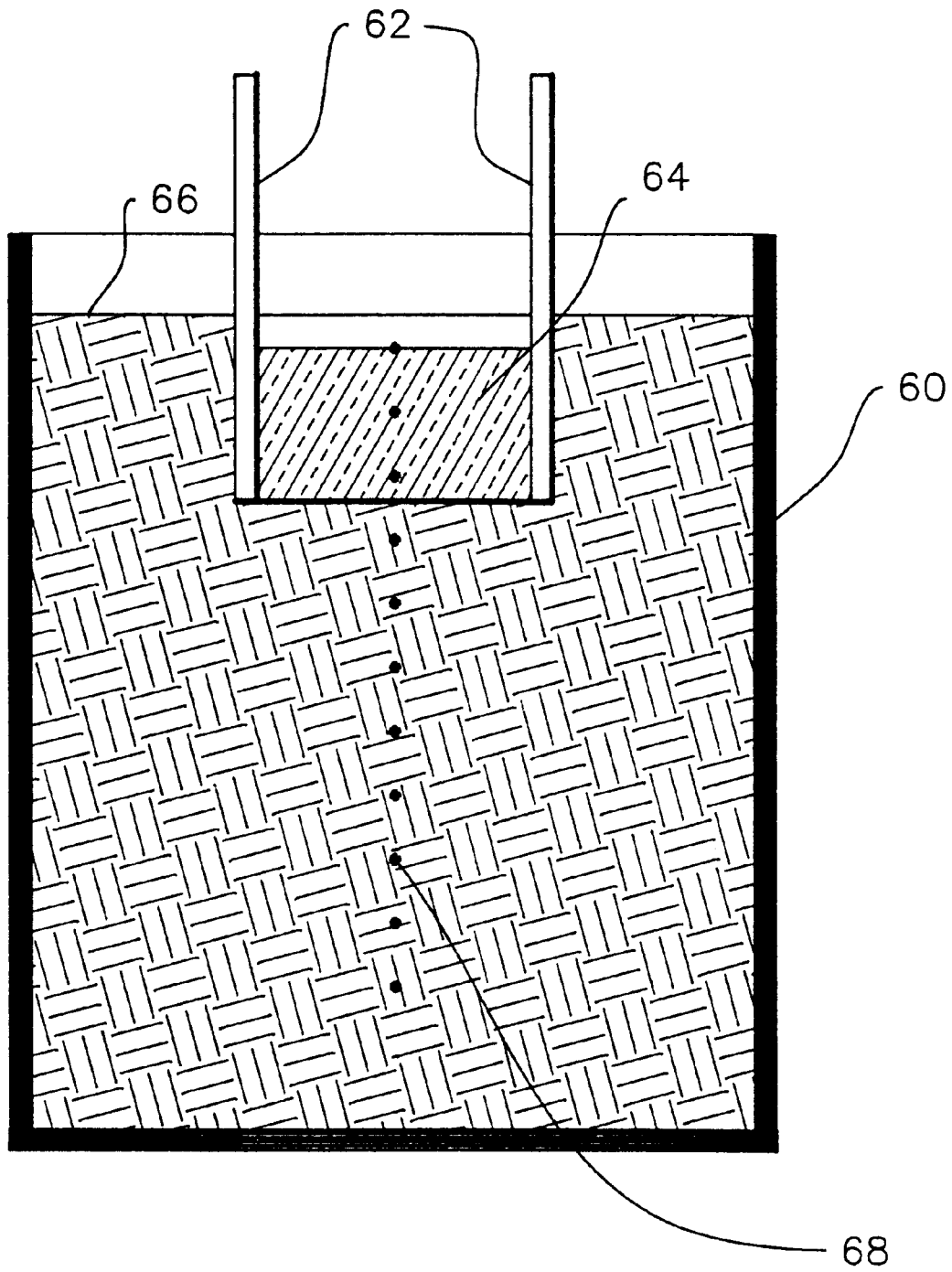
FIG. 8 is a schematic representation of an elevation view of the experimental apparatus of Example 1.

FIG. 7 illustrates the ability of the present invention to design a melt shape to more accurately and cost-effectively remediate a site. In the event that a site designated for remediation comprised a generally rectangular or square configuration (represented by the outline 56), conventional prior art technology would require a 4-electrode (57a, b, c, d) set and would create a generally circular melt pool 58. With the present invention, however, a similar 4 electrode set will create two distinct melt pools (59, 61) which fuse into a roughly rectangular shape 63. As is evident from the plan view of FIG. 7, the melt pool 63 of the instant invention saves the melting of the additional material (as at 65), thereby increasing the cost effectiveness of the process.

The starter path material of the present invention is preferably comprised of a combination of graphite flakes and glass frit. However, as will be evident to those skilled in this art, any electrically conductive material with the desired level of resistance for the melt size desired may be used as starter path material. As set forth in greater detail below, applicant has found that in a particular application, a starter path mixture may comprise approximately 50% graphite flakes and 50% glass frit, and in such case will provide optimum resistance for melting of surrounding soil. It is anticipated that the optimum starter path material and composition will vary with each different application of the invention—the design will provide the desired resistance to electrical flow for heating purposes to provide the desired melt geometry.

The electrodes, and thus the starter path, is most often oriented vertically within the solid material to be treated. For relatively narrow (Z direction) melts the electrodes and the starter path can be positioned from the outset to near the full target depth, thereby enabling melting of surrounding solid materials at full depth almost immediately after initiation of the process. Because of the full depth initiation, the "X" and "Z" dimensions at the lowermost portions of the melt pool will be much smaller than with conventional top-down melting where the melt pool grows laterally as it progresses downwardly to the target depth.

The improved starter path of the present invention presents a number of advantages over the conventional ISV operation. Assuming a target depth greater than a couple of feet (for example about 20 feet), the present invention completes melting much more quickly and efficiently than conventional ISV. Conventional ISV must "ramp-up" to full power, since as the melt grows in size, greater current is applied to the expanding melt pool. The present invention allows full power operation much more quickly, thus increasing the average melt power level and reducing overall melt cycle time by 10–20%.

Applicant has also found that performance of planar starter path melts is more energy efficient than those of prior art melt designs. The improved energy efficiency results from less heat being lost to the ground surface with the high aspect ratio of the present invention than is experienced with low aspect ratios of the prior art (the melt pool doesn't grow as large laterally). This further adds to the cost effectiveness of the instant invention.

Melt shape control will be enhanced in most vitrification or melting applications where maximum melt pool width ("Z") is not desired. Of perhaps greatest benefit is the potential for substantial reduction in operating costs: because the melt can be more targeted and localized, less "over melting" will occur and savings in time and energy, coupled with faster turnover of equipment, can reduce overall costs from 25–50% when compared to the prior art.

The significance of the present invention will be more apparent with reference to the following example.

EXAMPLE 1

A large scale ISV test was conducted to determine the feasibility of the present invention in an actual in-situ environment. At a site outside Spokane, Wash., Applicant prepared a relatively undisturbed site using Applicant's commercial scale in-situ vitrification equipment. Conventional 12-inch diameter solid graphite electrodes were used. After excavation, sonnotubes with electrodes therein (packed with a mixture of 1 part glass frit to 2 parts graphite flakes) were placed 15' apart. The planar starter path was constructed by stacking a plurality of 31" diameter tubes one on top of the other between the electrodes. 16 tubes were stacked to form a starter path 4' in height and 3" in thickness, and soil was back-filled as the tubes were stacked on top of one another. Each starter tube was filled with 3 parts glass frit to 2 parts graphite flakes.

As was consistent with other startups using the instant invention, Applicant observed that the electrical performance of the startup in this Example was unusually smooth, whereas prior art startups involved more erratic variations of electrical parameters that have to be carefully manually controlled during startup. The test lasted for a period of about 24 hours, during which a planar wall-shaped melt was produced to a depth of 5' and a width averaging 2' (an aspect ratio of about 2.5). The vitrified volume exhibited nearly vertical side walls. The power utilization efficiency was 1 kWh/ton of cooled mass. It is Applicant's experience that a conventional melt would have required several days to reach the 5' depth, and would have produced an excessively wide melt (4–5') at considerably lower energy efficiencies.

|           | kWh/ton | Aspect Ratio | Shape of Sides |
|-----------|---------|--------------|----------------|
| Example 1 | 1.0     | 2.5          | Vertical       |
| Prior Art | >1.0    | 1.0–1.5      | Rounded        |

Results

Figure 9:
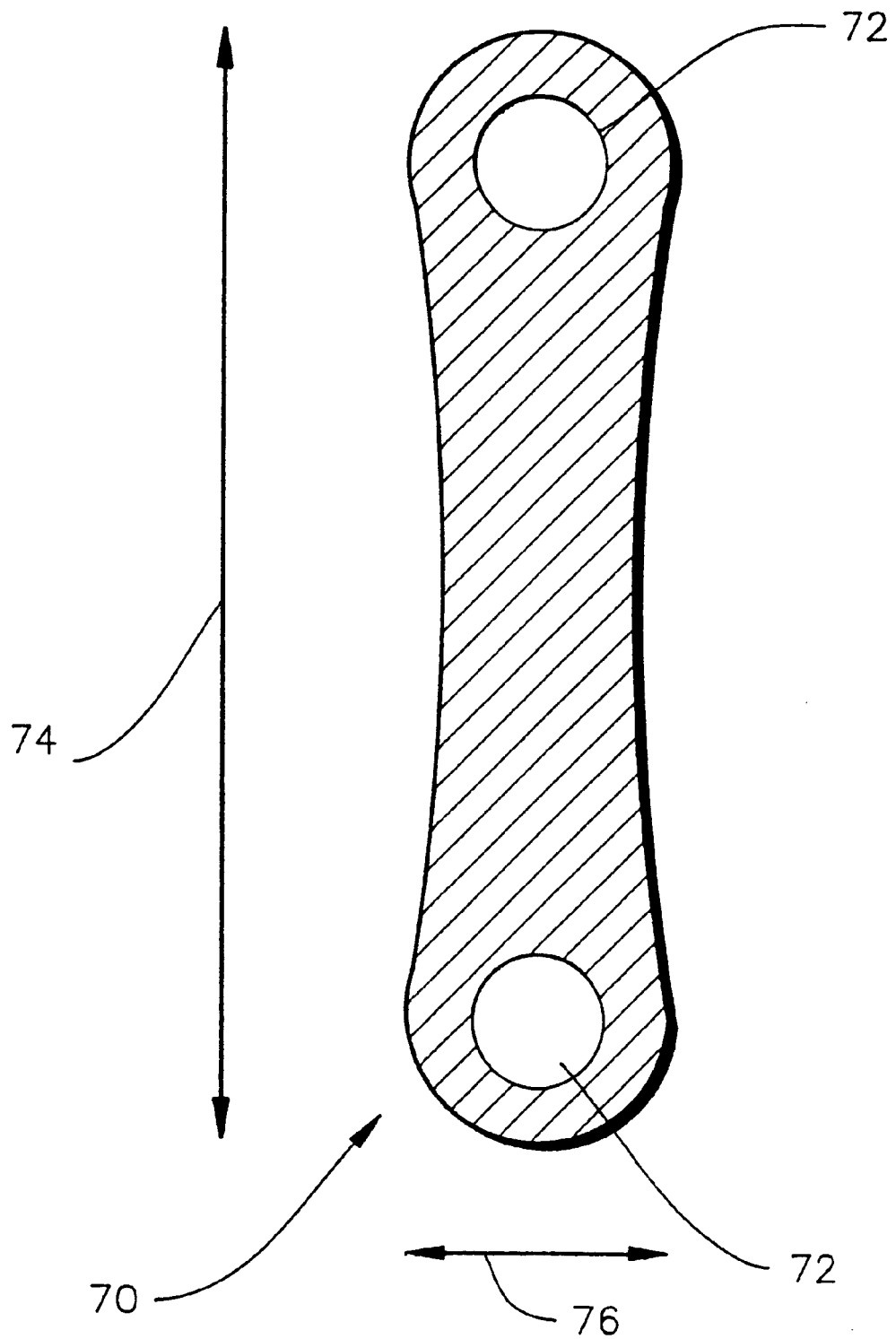
FIG. 9 is a representation of a plan view of the solidified melt pool produced by the method of the present invention in Example 2.

After power was shut off and the solidified mass 70 (FIG. 9) allowed to cool, dimensions of the mass were measured.

The total "X" dimension 74 was approximately 15'—the distance between the electrodes 72. No growth was noted beyond the electrodes in the "X" dimension. The height ("Y" dimension) of the mass varied from 55" to 58", and the width of the melt ("Z" dimension) 76 was from 16" to 30". No effort was made to optimize the energy efficiency in this test.

Discussion

Figure 2:
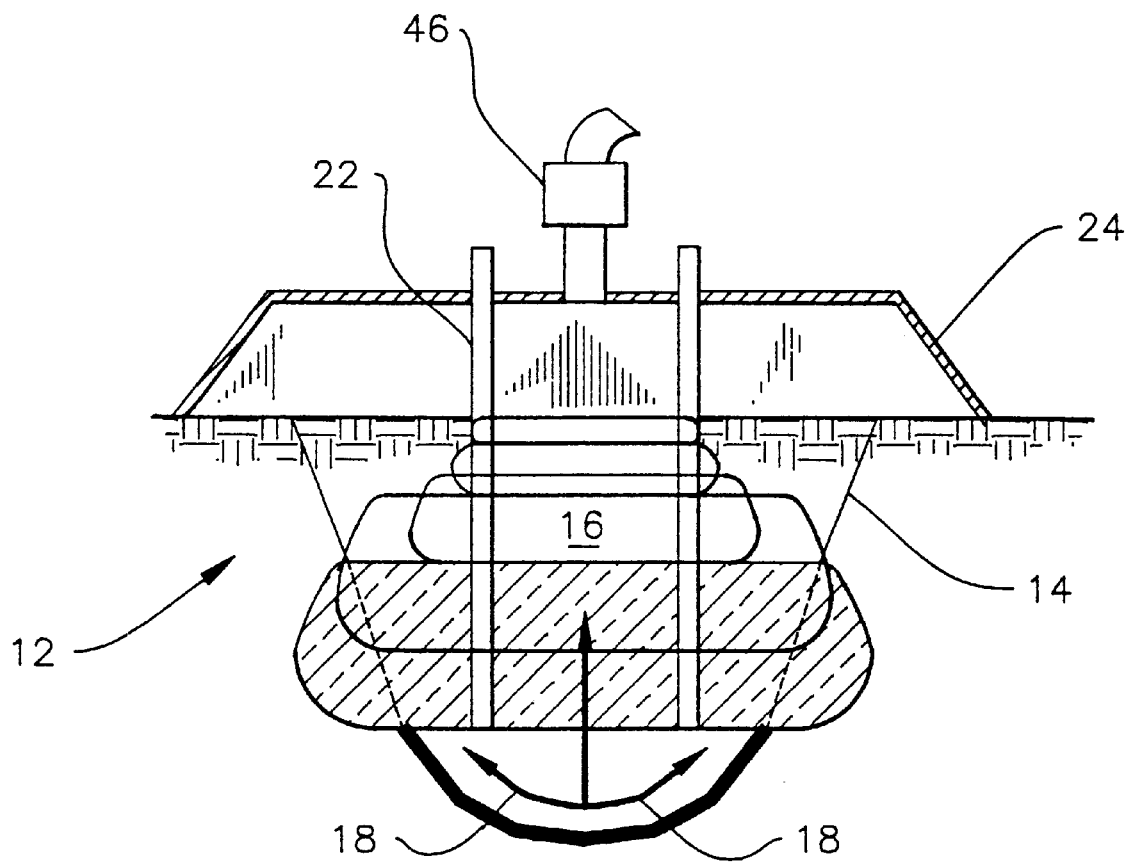
FIG. 2 is a schematic representation of a specific type of melt application and labeled "Prior Art"
Figure 10:
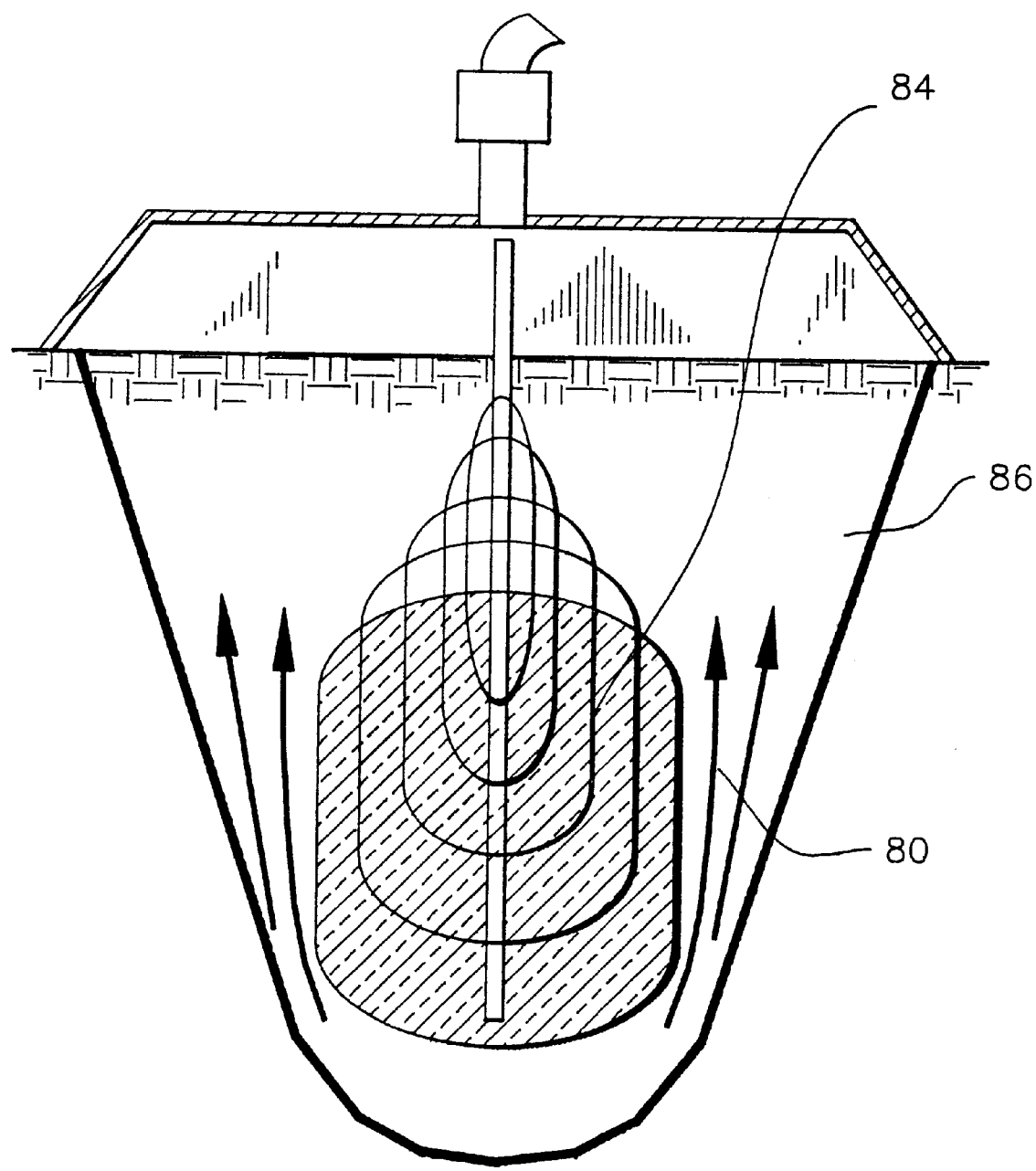
FIG. 10 is a schematic representation of the use of the present invention in the same environment as illustrated in FIG. 2.

It is apparent that the method of the present invention offers great latitude in designing ISV patterns to treat solid materials in a number of dimensional scenarios heretofore unavailable. The instant invention permits melts to be designed and conducted at much reduced cost, and with increased safety. For example, in treating wastes buried in trenches as set forth in FIG. 2, the method of the present invention will permit vapors to be "flushed" out the sides of the melt pool without disruption of the pool as previously experienced. As illustrated in FIG. 10, the vapors 80 from liquid 82 may escape the bottom of the melt pool 84 within trench 86. Because the aspect ratio of the melt pool is substantially greater than that of a conventional ISV process, the melt pool does not span the trench from side to side before it reaches the bottom of the trench—especially valuable where rock side walls may be present. It is anticipated that when optimized, the energy efficiency of melts made according to the present invention will have an energy efficiency of 0.7, or less.

Figure 11A:
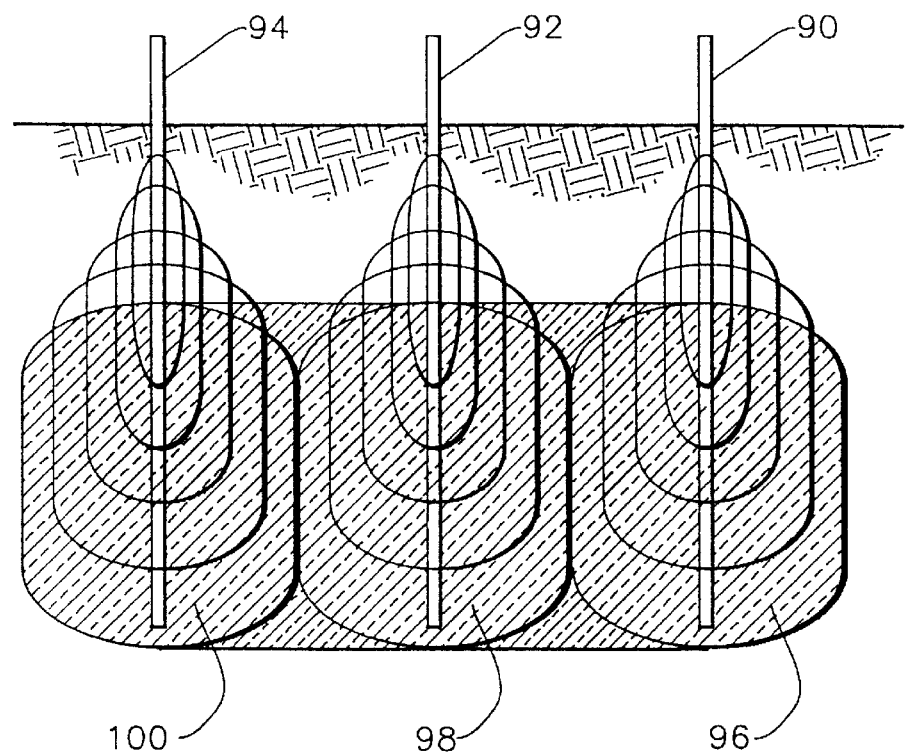
FIG. 11a is a schematic representation of an elevation view of a multiple electrode set of the method of the present invention.
Figure 11B:
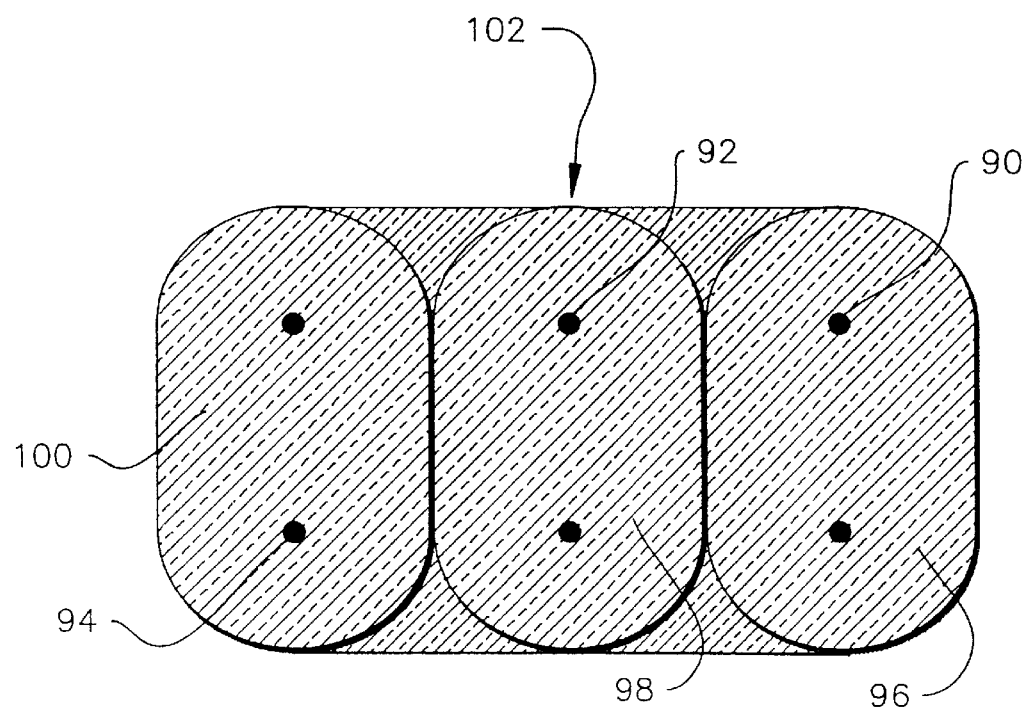
Figure 12:
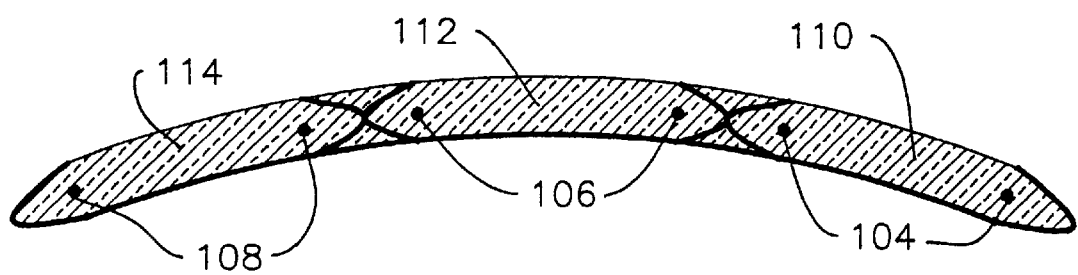
FIG. 12 is a schematic representation of a plan view of a further embodiment of the present invention.

A massive monolith may be constructed by initiating successive melts side-by-side (FIGS. 11*a* and 11*b*). In this embodiment, successive electrode sets 90, 92, 94 may be made, with the respective melt pools 96, 98, 100 fusing together to form a relatively cubic block 102, without the "balloon" shape, and the associated unintended vitrification of adjacent uncontaminated soil, associated with the prior art. Alternatively, relatively thin walls (FIG. 12) may be constructed by arranging the sequential electrode sets 104, 106, 108 end-to-end to create adjacent individual walls 110, 112, 114 which fuse together. Such walls may be constructed as straight, segmented (generally curved), or arranged into enclosed shapes to be used for, among other things, underground barriers to prevent migration of pollutants, or as a "vault" around a discrete area of pollutants to essentially contain the impacted area.

Figure 13:
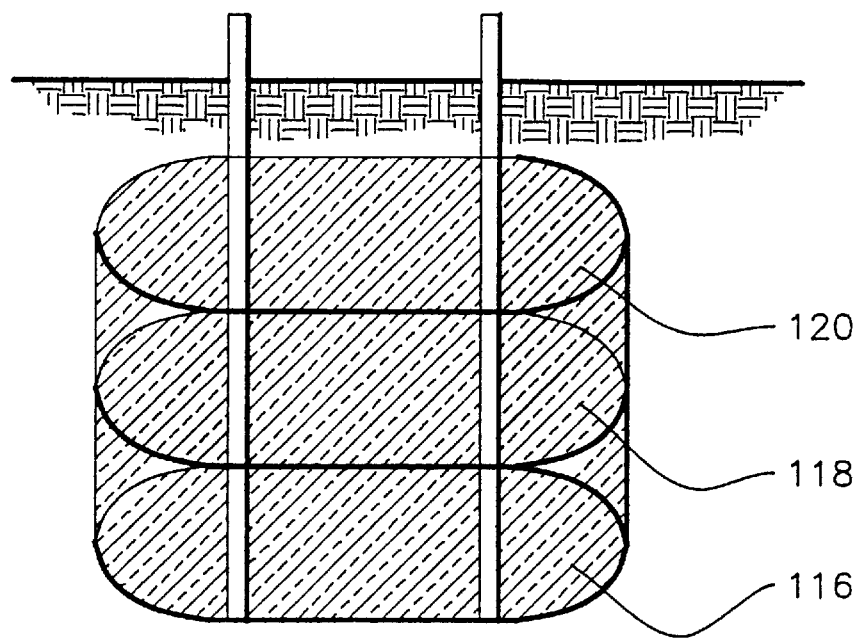
FIG. 13 is a schematic representation of an elevation view of a still further embodiment of the present invention.

Still other shapes may be constructed by the method of the present invention. For example, as illustrated in FIG. 13, multiple planar starter paths may be arranged one on top of the other to create a vertical wall from a plurality of hardened melt pools 116, 118, 120. Such design may be used when it is impracticable or inconvenient to construct the wall in a single melt, when the desired depth exceeds the practical limitations for melting depth of the present invention, or if limited by the available equipment power level. Single or multiple electrode sets may be used for such an embodiment.

Figure 14B:
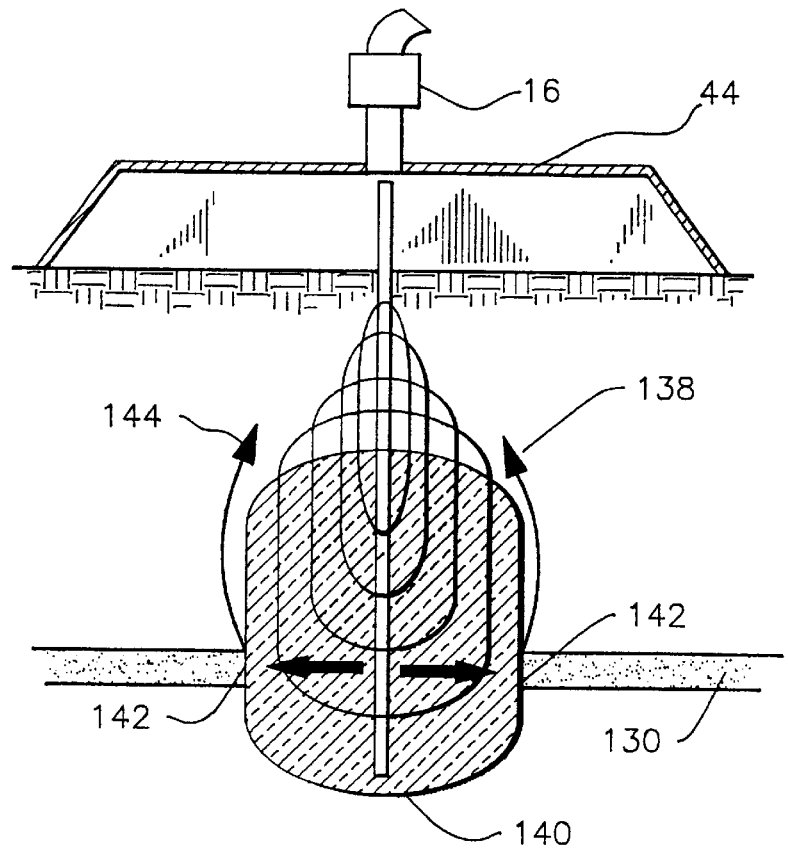
FIG. 14b is a schematic representation of the method of the present invention in the environment of FIG. 14a, and FIG. 15 is a graph illustrating a comparison between the instant invention and the prior art.
Figure 14A:
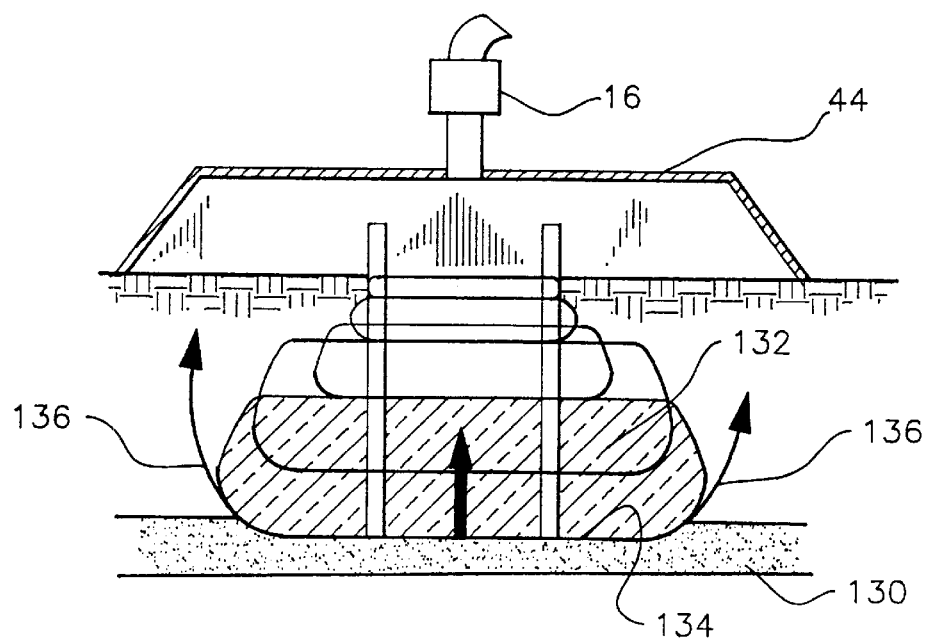
FIG. 14a is a schematic representation of a specific type of melt labelled "Prior Art"

Subterranean strata may be encountered wherein a-discrete, highly contaminated organic layer 130 is disposed in a horizontal configuration, as illustrated graphically in FIG. 14*a*. When a conventional melt pool 132 with a low aspect ratio and broad lower boundary 134 contacts the layer, a large amount of the organic material is rapidly vaporized (at 136), possibly overwhelming the ability of the off-gas treatment system 46 to treat the released gases. Additionally, the long pathway for vapors to traverse the bottom of the melt 132 increases the likelihood that a portion of the vapor will pass upwardly through the melt, causing the problems noted above. Conversely, the melt pool 138 of the present invention (arranged in FIG. 14*b* at a right angle to the orientation of FIG. 14*a*) attacks the organic layer 130 with a relatively small lower boundary 140, and once through the layer, the side boundaries 142 of the melt pool are likewise small enough to produce a manageable amount of the vaporized organic material 144.

Figure 15:
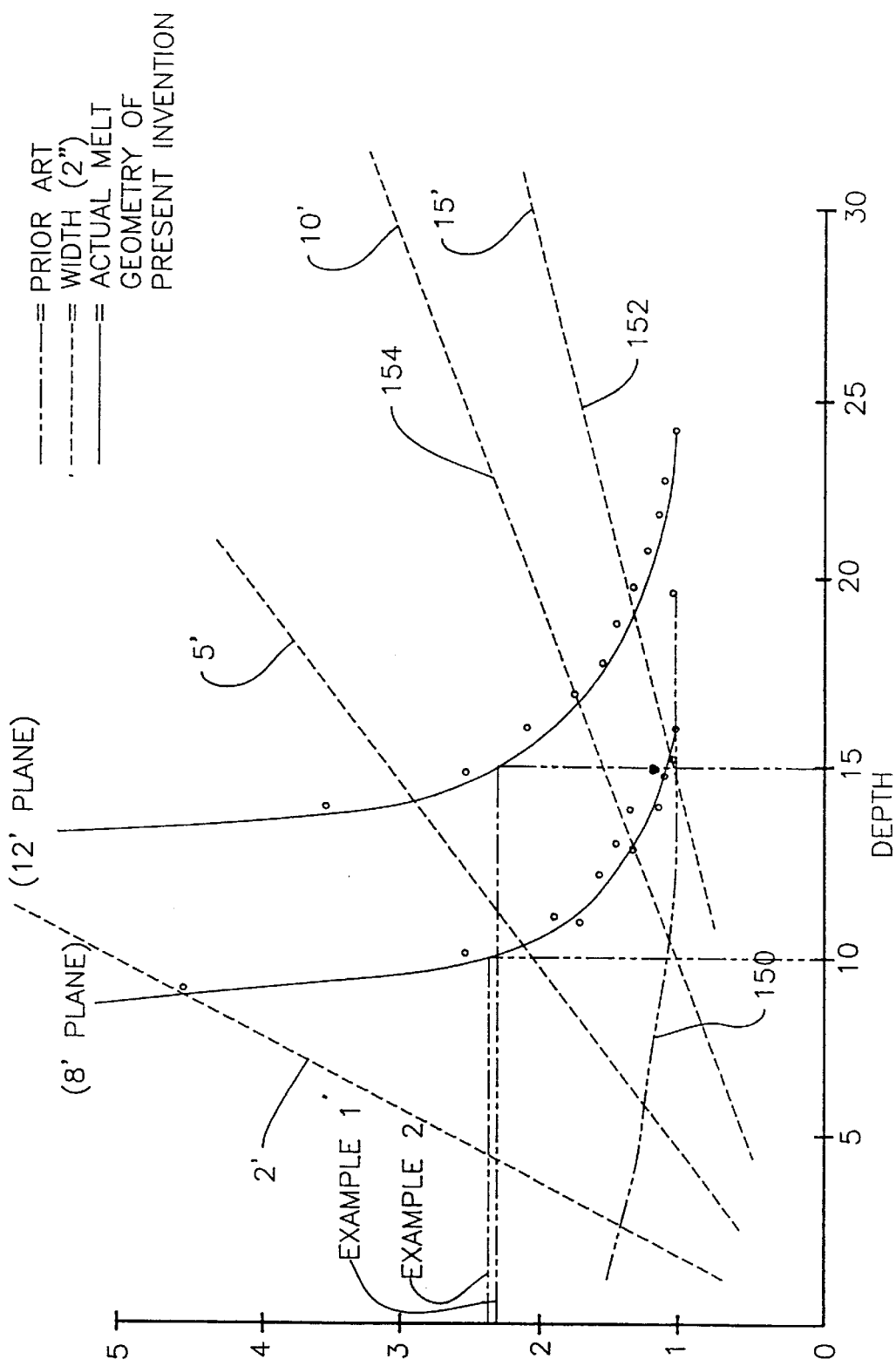

FIG. 15 graphically illustrates the mathematical relationship between the aspect ratio (depth/width) and depth and width individually, and provides a method of identifying the depth of planar starter path needed to produce a melt of the desired depth and aspect ratio. With the aspect ratio plotted on the ordinate, and depth plotted on the abscissa, the width of melt that satisfies those conditions can be plotted, as indicated by the 2', 5', 10' and 15' melt width lines originating at the origin. Similar lines for any desired melt width can be plotted. To understand the use of the plotted melt width lines, consider for example that a 10' wide melt at a depth of 30' requires an aspect ratio of 3. Similarly, a 10' deep melt that is 5' wide requires an aspect ratio of 2.

While the chart of FIG. 15 can be used by engineers to specify the aspect ratio required for a particular melt, it is necessary to couple this information with the inherent growth characteristics of melts in the media being treated in order to determine the depth of planar starter path to be employed for a particular melt. This coupling is indicated by the curved lines on the chart which are representative of 8' and 12' deep planar starter path melts in typical silica based soil (the 8' and 12' lines represent the starting depth of the planar starter path) Similar lines can be constructed for starter paths of different depths.

ILLUSTRATIVE EXAMPLE I

If a 10' deep melt with an aspect ratio of 2 (e.g. 5' wide) is desired, an engineer would employ a planar melt that used an 8' deep planar starter path. Such a planar melt would start 8' deep with a very high aspect ratio, and would grow to a width of 5' by the time it melted to a depth of 10', thus attaining the desired depth and aspect ratio objectives.

ILLUSTRATIVE EXAMPLE II

If a melt 15' deep and 7' wide is desired, it could not be accomplished with an 8' deep planar starter path, but could be achieved by employing a 12' deep planar starter path. The 12' deep starter path would produce a melt with a very high aspect ratio initially, and would widen to 7' by the time it melted to a depth of 15', reaching the target dimensions with an aspect ratio of about 2.1.

ILLUSTRATIVE EXAMPLE III

If a wall-like melt 10' deep and 2' wide is desired, a 9' deep starter plane can be used. By the time the melt grows to a depth of 10' the melt will have grown to a width of about 2'.

It is apparent that the planar starter paths can produce melts substantially below their original starting point, however at the cost of the aspect ratio and melt efficiency. For example, in the ILLUSTRATIVE EXAMPLE II above, an 8' deep starter path could be utilized for a 15' deep melt, however the aspect ratio will be only about 1.3. If a higher aspect ratio is desired, a deeper starter path is required. The method of the present invention enables Applicant to mathematically model these relationships based on actual melting characteristics of various media to be treated.

While a number of embodiments of the present invention have been shown and described herein, it will be apparent to those skilled in this art that many other changes and modifications may be made to the inventions disclosed, without departing from the invention in its broadest aspects.

Accordingly, the scope of this invention should be determined solely by the scope of the claims appended hereto, which are intended to cover all such changes and modifications that fall within the scope of the invention.

We claim:

1. A method of producing a designed melt shape during melting of solid material, comprising the steps of:
   a. inserting a plurality of spaced-apart electrodes into the solid material to be melted, said electrodes having a linear dimension within said solid material;
   b. emplacing a planar starter path of electrically conductive resistance materials between at least two of said electrodes, said planar starter path traversing the distance between said electrodes, such that said starter path is in contact with the electrodes over a substantial portion of the linear dimension of the electrodes and defines a substantially vertically-oriented plane between said electrodes with a depth dimension ("Y") greater than the width ("Z") dimension;
   c. applying electricity to said planar starter path such that said solid materials are melted in a plane having "X" (length) and "Y" dimensions substantially greater than the "Z" dimension.

2. The method of claim 1, wherein the method further comprises inserting the electrodes into a quantity of relatively undisturbed solid earthen material having a quantity of hazardous contaminants therein.

3. The method of claim 1, wherein the method further comprises inserting the electrodes into a quantity of staged solid earthen material moved to a treatment site.

4. The method of claim 1, wherein the electrodes are inserted into the solid material at a depth to which the solid materials are to be melted.

5. The method of claim 4, wherein the aspect ratio ("Y"/"z") of the melted solid material is in the range of 1.0 to 20.

6. The method of claim 1 wherein the starter path is selected from the group consisting of graphite flakes, sodium hydroxide, sacrificial resistance elements, chemical reagents, or mixtures thereof.

7. The method of claim 6 wherein the starter path is selected from the group consisting of graphite flakes, glass frit and soil, or a mixture thereof.

* * * * *